United States Patent
Lin et al.

(10) Patent No.: US 12,400,317 B2
(45) Date of Patent: Aug. 26, 2025

(54) METHOD OF DETECTING PRINTING DEFECTS, COMPUTER DEVICE, AND STORAGE MEDIUM

(71) Applicant: HON HAI PRECISION INDUSTRY CO., LTD., New Taipei (TW)

(72) Inventors: Yen-Yi Lin, New Taipei (TW); Cheng-Feng Wang, Kaohsiung (TW); Li-Che Lin, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 400 days.

(21) Appl. No.: 17/854,224

(22) Filed: Jun. 30, 2022

(65) Prior Publication Data
US 2023/0093969 A1    Mar. 30, 2023

(30) Foreign Application Priority Data
Sep. 17, 2021    (CN) .......................... 202111092202.X

(51) Int. Cl.
*G06T 7/00*    (2017.01)
*G06V 30/12*    (2022.01)

(52) U.S. Cl.
CPC ............ *G06T 7/001* (2013.01); *G06V 30/133* (2022.01); *G06T 2207/30144* (2013.01)

(58) Field of Classification Search
CPC ........... G06T 7/001; G06T 2207/30144; G06T 2207/10008; G06T 2207/20044; G06V 30/133; G06V 30/148; G06V 30/168; G06V 30/1801
See application file for complete search history.

(56) References Cited

U.S. PATENT DOCUMENTS

| 2015/0278626 A1* | 10/2015 | Nakamura | G06V 30/153 382/177 |
| 2020/0223230 A1* | 7/2020 | Krieger | B41J 2/2146 |
| 2023/0009564 A1* | 1/2023 | Huo | G06T 5/20 |

FOREIGN PATENT DOCUMENTS

| CN | 110293753 A | 10/2019 |
| CN | 112763513 | 5/2021 |
| JP | 2004276476 A * | 10/2004 |

OTHER PUBLICATIONS

Wang, Real-time Defect Detection Method for Printed Images Based on Grayscale and Gradient Differences, Jan. 22, 2018, Journal of Engineering Science and Technology Review, 180-188 (Year: 2018).*

* cited by examiner

*Primary Examiner* — Oneal R Mistry
*Assistant Examiner* — Justin Philip Cascais
(74) *Attorney, Agent, or Firm* — ScienBiziP, P.C.

(57) ABSTRACT

This application provides a method of detecting printing defects. The method includes obtaining a first image of each character in a reference image. A third image of each character is obtained based on the first image of each character, a fourth image of each character is obtained based on a second image of each character obtained from an image to be detected. Once a fifth image of each character is obtained based on the third image of each character, a sixth image of each character is obtained according to the fourth image and the fifth image of each character, a detection result of each character in the image to be detected is determined according to the fifth image and the sixth image of the each character.

6 Claims, 3 Drawing Sheets

METHOD OF DETECTING PRINTING DEFECTS, COMPUTER DEVICE, AND STORAGE MEDIUM

FIELD

The present disclosure relates to image defect detection technologies, in particular to a method of detecting printing defects, a computer device, and a storage medium.

BACKGROUND

Generally, detections of defects utilizing existing defect detection technologies can be easily achieved when the printed characters have fewer strokes, such as numbers and English letters because a variation range of an area of the character is small. However, when the existing defect detection technology is used to detect complex printed characters with many strokes, such as Chinese characters and Japanese characters, because shape defects of characters cannot be easily detected by human eye, a situation of over correcting may occur. A detection method based on Hu moments may not easily describe shape features of the characters, resulting adjustments of preprocessing procedures to reduce the over correcting. Furthermore, Hu moments do not provide adjustment directions.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
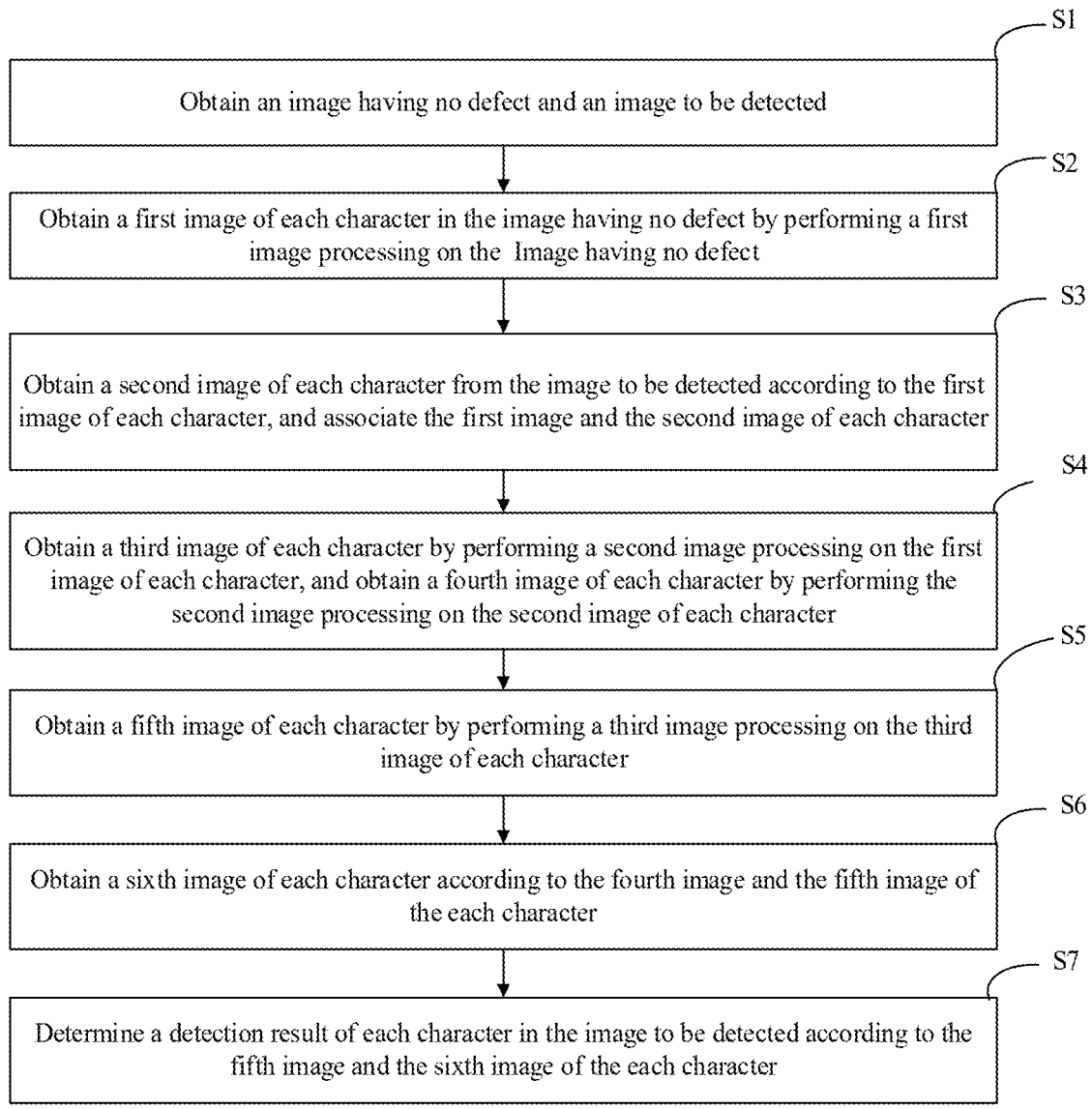
FIG. 1 is a flowchart of a method of detecting printing defects provided by an embodiment of the present disclosure.

FIG. 1 illustrates a flow chart of one embodiment of a method of detecting printing defects.

Figure 2:
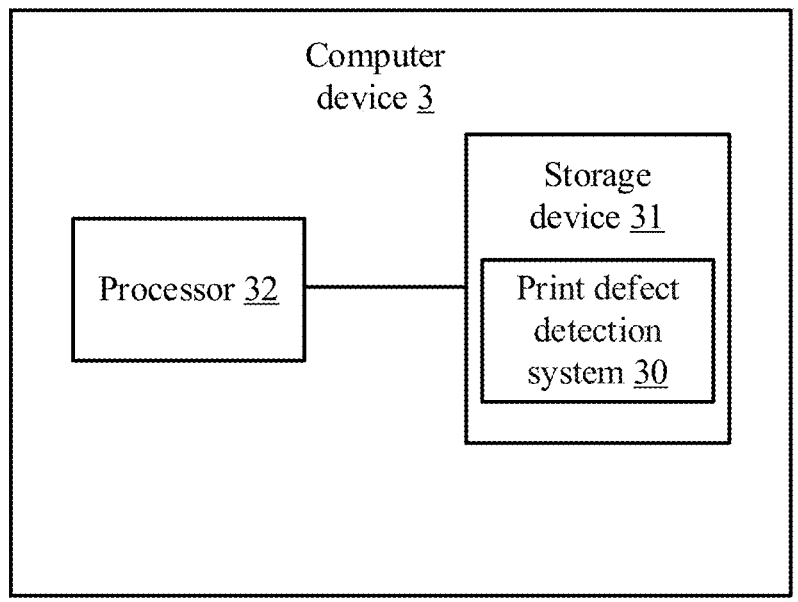
FIG. 2 is a structural diagram of a computer device provided by an embodiment of the present disclosure.

In one embodiment, the method of detecting printing defects can be applied to a computer devices (such as a computer device 3 as shown in FIG. 2), for a computer device that needs to perform the method of detecting printing defects, a function of performing the method of detecting printing defects can be directly integrated in the computer device, or can run on the computer device as a Software Development Kit (SDK).

As shown in FIG. 1, the method of detecting printing defects can include the following blocks. According to different requirements, the sequence of blocks in the flow chart can be changed, and some blocks can be omitted.

At block S1, the computer device obtains an image having no defect (hereinafter named as "reference image") and an image to be detected.

In one embodiment, the computer device can obtain the reference image and the image to be detected in response to user input. The reference image and the image to be detected can also be pre-stored in a storage device of the computer device, or can be pre-stored in another device connected with the computer device. For example, when the computer device detects an input signal, the computer device obtains the reference image from the storage device.

In this embodiment, the reference image can be an image of a rectangular Golden Sample of a printed matter produced by a factory, that is, a direction of alignment of characters in the reference image does not need to be corrected. In this embodiment, the characters contained in the reference image may refer to Chinese characters, numbers, English letters, etc.

The image to be detected can be a rectangular image taken of the printed matter which needs to be detected. In one embodiment, a size of the image to be detected is consistent with that of the reference image.

At block S2, the computer device obtains a first image of each character in the reference image by performing a first image processing on the reference image.

In one embodiment, the obtaining of the first image of each character in the reference image by performing the first image processing on the reference image includes: determining a first position of each character in the reference image; and segmenting each character in the reference image according to the first position of each character in the reference image.

In one embodiment, by using an Optical Character Recognition (OCR) technology, the computer device can recognize each character in the reference image, and confirm the first position of each character in the reference image. For example, the computer device can separately select each character in the reference image by applying a rectangular frame according to the first position of each character in the reference image, each character corresponds to one rectangular frame, and each rectangular frame contains a full image of one of the characters in the reference image.

Figure 3:
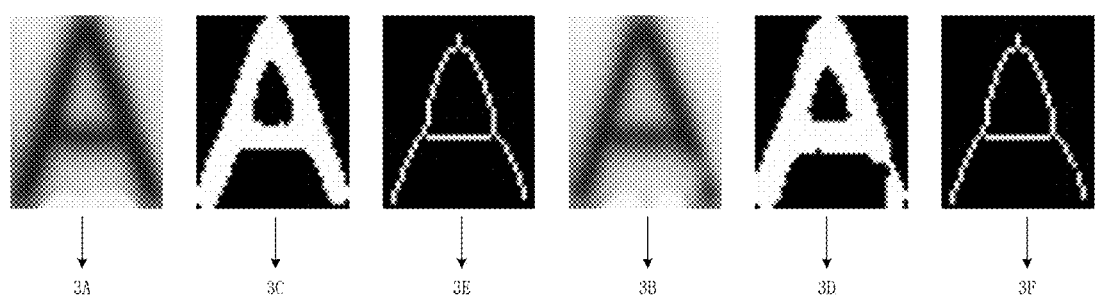
FIG. 3 is an example diagram of images of the letter "A" provided by the embodiment of the present disclosure.

In one embodiment, the computer device may obtain the first image of each character in the reference image by segmenting each character in the reference image according to the first position of each character using a function of cutting character of an OCR software. For example, the computer device obtains the first image of each character by cutting out each character in the reference image along an edge of a corresponding rectangular frame. For example, as shown in FIG. 3, the computer device obtains a first image 311 of a letter "A" in a reference image.

At block S3, the computer device obtains a second image of each character from the image to be detected according to the first image of each character. The computer device associates the first image and the second image of each character.

In one embodiment, by using an image feature matching algorithm, the computer device takes the first image of each character as a target image, identifies the target image from the image to be detected, and cuts out the identified target image from the image to be detected, thereby the second image of each character is obtained, the second image of each character matches the first image of the each character. It should be noted that, since each character at block S2 has a unique first image, a one-to-one correspondence is established between the first image of each character and the second image of each character, and a size of the first image of each character is consistent with a size of the second image of each character. For example, as shown in FIG. 3, a second image 312 of the letter "A" is obtained from the image to be detected according to the first image 311 of the letter "A" in the reference image.

At block S4, the computer device obtains a third image of each character by performing a second image processing on the first image of each character, and obtains a fourth image of each character by performing the second image processing on the second image of each character.

In one embodiment, the second image processing includes: performing image binarization according to a preset binarization threshold, where the preset binarization threshold may be determined by an OTSU algorithm.

The performing the second image processing on the first image of each character includes: determining a first binarization threshold (for example, 100) of the first image of each character by using the Otsu algorithm, and when a pixel value of a pixel at any position in the first image of each character is greater than or equal to the first binarization threshold, binarizing the pixel at the any position to be 255; when the pixel value of the pixel at the any position in the first image of the each character is smaller than the first binarization threshold, binarizing the pixel at the any position to be to 0. For example, as shown in FIG. 3, the computer device obtains a third image 313 of the letter "A" by binarizing the first image 311 of the letter "A" in the reference image according to the first binarization threshold 100.

The performing the second image processing on the second image of each character includes: determining a second binarization threshold (for example, 130) of the second image of each character by using the Otsu algorithm; binarizing a pixel at any position in the second image of each character to be to 255 when a pixel value of the pixel at the any position in the second image of each character is greater than or equal to the second binarization threshold; and binarizing the pixel at the any position in the second image of the each character to be 0 when the pixel value of the pixel at the any position in the second image of each character is smaller than the second binarization threshold. For example, as shown in FIG. 3, the computer device obtains a fourth image 314 of the letter "A" by binarizing the first image 312 of the letter "A" in the image to be detected according to the second binarization threshold 130.

It should be noted that, as shown in FIG. 3, the pixel value of the pixel of the character outline in the third image of each character obtained by performing image binarization on the first image of each character according to the preset binarization threshold is 255, and the pixel value of the pixel of the character outline in the fourth image of each character obtained by performing image binarization on the second image of each character according to the preset binarization threshold is 255.

At block S5, the computer device obtains a fifth image of each character by performing a third image processing on the third image of each character.

In one embodiment, the third image processing includes: thinning an outline of a character (hereinafter named as "character outline") using an image thinning algorithm. The computer device extracts a skeleton of a character outline of the character and maintains a connectivity of the character outline in the image that has been binarized by using the image thinning algorithm. For example, as shown in FIG. 3, the computer device obtains a fifth image 315 of the letter "A" by thinning the third image 313 of the letter "A" in the reference image, a pixel value of each pixel in the thinned character outline is 255.

At block S6, the computer device obtains a sixth image of each character according to the fourth image and the fifth image of the each character.

In one embodiment, the obtaining the sixth image of the each character according to the fourth image and the fifth image of the each character includes: obtaining a mask image of the fourth image and the fifth image of the each character by performing a Bitwise AND operation to the fourth image and the fifth image of the each character, and setting the mask image as the sixth image of the each character. For example, as shown in FIG. 3, the computer device performs a Bitwise AND operation to the fourth image 314 and the fifth image 315 of the letter "A" and obtains the sixth image 316 of the letter "A".

In this embodiment, the pixel value of each pixel in the character outline in the sixth image of the each character is 255.

At block S7, the computer device determines a detection result of each character in the image to be detected according to the fifth image and the sixth image of the each character.

Figure 4:
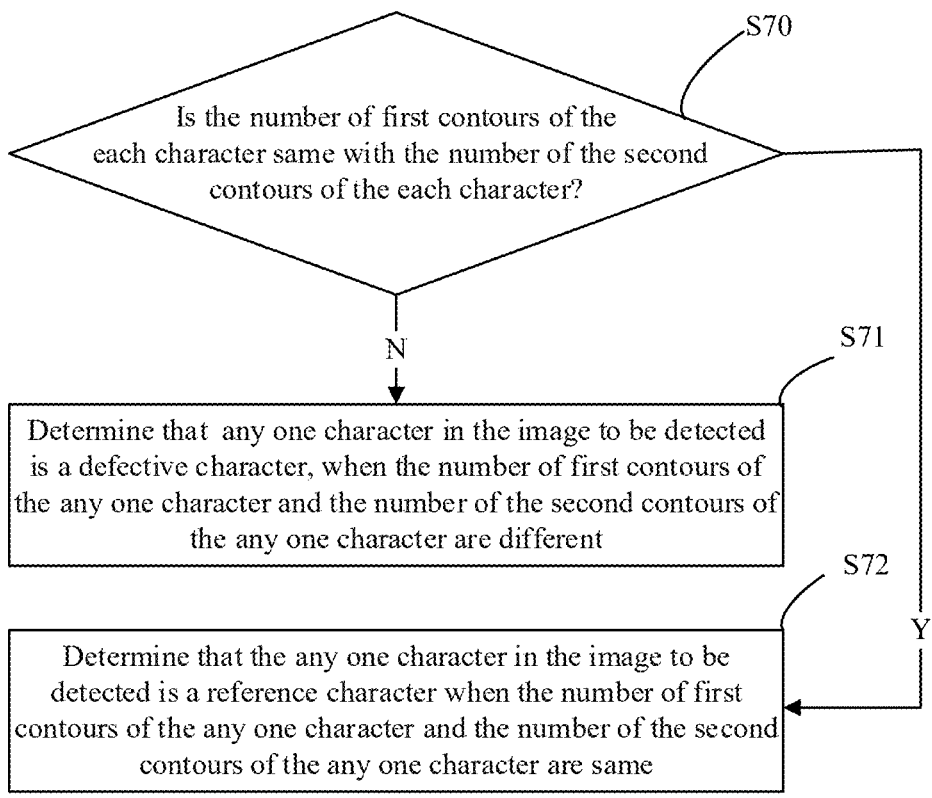
FIG. 4 is a flowchart of block S7 provided by an embodiment of the present disclosure.

In one embodiment, determining the detection result of each character in the image to be detected according to the fifth image and the sixth image of the each character includes: obtaining a number of first contours of each character by determining a number of character outlines in the fifth image of the each character; and obtaining a number of second contours of the each character by determining a number of character outlines in the sixth image of the each character. The number of first contours of each character includes a number of first inner contours and a number of first outer contours of the each character, and the number of second contours of the each character includes a number of second inner contours and a number of second outer contours of the each character. The computer device may use a CVfindContours function of an OpenCV algorithm to obtain the number of first contours and the number of second contours of each character, and then the process goes to block S70 as shown in FIG. 4.

At block S70, the computer device compares the number of first contours of each character with the number of the second contours of the each character; when the number of first contours of the each character and the number of the second contours of the each character are not equal, block S71 is performed; and when the number of first contours of the each character and the number of the second contours of the each character are equal, block S72 is performed.

In one embodiment, the computer device first compares the number of first inner contours with the number of the second inner contours of the each character, and then compares the number of first outer contours of the each character with the number of second outer contours of the each character. For any one of the characters, the computer device determines that the number of first contours of the any one character and the number of the second contours of the any one character are equal under the condition that the number of first inner contours of the any one character is equal to the number of second inner contours of the any one character, and the number of first outer contours of the any one character is equal to the number of second inner contours of the any one character. It should be noted that, when the computer device confirms that the number of first inner contours is not equal to the number of the second inner contours of the any one character, the computer device no longer make determination regarding whether the number of the first outer contours and the number of second outer contours of the any one character is equal, and the computer device can directly confirm that the number of first character outlines of the any one character is not equal to the number of second character outlines of the any one character.

For example, referring to FIG. 3, the computer device determines that a number of first inner contour of the letter "A" in the fifth image 315 of the letter "A" is 1, and determines that a number of first outer contour of the letter "A" is 1, and determines that a number of second inner contour of the letter "A" in the sixth image 316 of the letter "A" is 1, and determines that a number of second outer contour of the letter "A" is 2, since the number of first outer contour is not equal to the number of the second outer contour of the letter "A", the computer device determines that the number of first character outlines of the letter "A" is not equal to the number of the second character outlines of the letter "A".

At block S71, for any one of the characters, the computer device determines that the any one character in the image to be detected is a defective character, when the number of first contours of the any one character and the number of the second contours of the any one character are not equal.

For example, it can be known from block S70 that the letter "A" in the image to be detected in FIG. 3 is a defective character. It should be noted that when the number of the first contours of the any one character is not equal to the number of the second contours of the any one character, the computer device can confirm that the skeleton of the any one character in the image to be detected is broken, and the any one character is a defective character.

At block S72, for any one of the characters, the computer device determines that the any one character in the image to be detected is a standard character, when the number of first contours of the any one character and the number of the second contours of the any one character are equal.

FIG. 1 describes in detail the method of detecting printing defects of the present disclosure. Hardware architecture that implements the method of detecting printing defects is described in conjunction with FIG. 2.

It should be understood that the described embodiments are for illustrative purposes only, and are not limited by this structure in the scope of the claims.

FIG. 2 is a block diagram of a computer device provided by the present disclosure. The computer device 3 may include a storage device 31 and at least one processor 32. It should be understood by those skilled in the art that the structure of the computer device 3 shown in FIG. 2 does not constitute a limitation of the embodiment of the present disclosure. The computer device 3 may further include other hardware or software, or the computer device 3 may have different component arrangements.

In at least one embodiment, the computer device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 3 is merely an example, and other existing or future electronic products may be included in the scope of the present disclosure, and are included in the reference.

In some embodiments, the storage device 31 can be used to store program codes of computer readable programs and various data, such as the reference images and image to be detected, and a defect detection system 30 installed in the computer device 3, and automatically access the programs or data with high speed during the running of the computer device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking the data stored in the storage device 31, the at least one processor 32 can perform various functions of the computer device 3 and process data of the computer device 3. For example, the processor 32 may perform the defect detection function shown in FIG. 1.

In some embodiments, the defect detection system 30 operates in computer device 3. The defect detection system 30 may include a plurality of functional modules composed of program code segments. The program code of each program segment in the defect detection system 30 can be stored in storage device 31 of the computer device 3 and executed by at least one processor 32 to achieve blocks as shown in FIG. 1.

In this embodiment, the defect detection system 30 can be divided into a plurality of functional modules. The module means a series of computer program segments that can be executed by at least one processor 32 and perform fixed functions and are stored in storage device 31.

The program codes are stored in storage device 31 and at least one processor 32 may invoke the program codes stored in storage device 31 to perform the related function. The program codes stored in the storage device 31 can be executed by at least one processor 32, so as to realize the function of each module to achieve the purpose of detecting printing defects as shown in FIG. 1.

In one embodiment of this application, said storage device 31 stores at least one instruction, and said at least one instruction is executed by said at least one processor 32 for the purpose of detecting printing defects as shown in FIG. 1.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more DC or AC power sources, a recharging device, a power failure detection circuit, a power converter or inverter, a power status indicator, and the like. The computer device 3 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method of detecting printing defects applied to a computer device, the method comprising:
obtaining a reference image and an image to be detected;
obtaining a first image of each character in the reference image by performing a first image processing on the reference image, comprising: determining a first position of each character in the reference image; selecting each character in the reference image by applying a rectangular frame according to the first position of each character in the reference image, wherein there are a plurality of characters in the reference image, and each character in the reference image corresponding to one rectangular frame; and obtaining the first image of each character by cutting each character in the reference image along an edge of a corresponding rectangular frame;
obtaining a second image of each character from the image to be detected according to the first image of each character, and associating the first image and the second image of each character, wherein the second image of each character matches the first image of the each character;
obtaining a third image of each character by performing a second image processing on the first image of each character, and obtaining a fourth image of each character by performing the second image processing on the second image of each character;
obtaining a fifth image of each character by performing a third image processing on the third image of each character;
obtaining a sixth image of each character according to the fourth image and the fifth image of the each character; and
determining a detection result of each character in the image to be detected according to the fifth image and the sixth image of the each character, comprising:
obtaining a number of first contours of each character by determining a number of character outlines in the fifth image of the each character; and obtaining a number of second contours of the each character by determining a number of character outlines in the sixth image of the each character;
comparing the number of first contours of each character with the number of the second contours of the each character;
determining that the character in the image to be detected is a defective character, when the number of first contours and the number of the second contours of the corresponding character are not equal; and
determining that the character in the image to be detected is a standard character, when the number of first contours and the number of the second contours of the corresponding character are equal.

2. The method according to claim 1, wherein the number of first contours of each character comprises a number of first inner contours and a number of first outer contours of the each character, and the number of second contours of the each character comprises a number of second inner contours and a number of second outer contours of the each character;
wherein the method further comprises: in response that the number of first inner contours of any one character is equal to the number of second inner contours of the any one character, and the number of first outer contours of the any one character is equal to the number of second inner contours of the any one character, determining that the number of first contours of the any one character is equal to the number of the second contours of the any one character.

3. A computer device comprising:
a storage device;
at least one processor; and
the storage device storing one or more programs, which when executed by the at least one processor, cause the at least one processor to:
obtain a reference image and an image to be detected;

obtain a first image of each character in the reference image by performing a first image processing on the reference image, comprising: determining a first position of each character in the reference image; selecting each character in the reference image by applying a rectangular frame according to the first position of each character in the reference image, wherein there are a plurality of characters in the reference image, and each character in the reference image corresponding to one rectangular frame; and obtaining the first image of each character by cutting each character in the reference image along an edge of a corresponding rectangular frame;

obtain a second image of each character from the image to be detected according to the first image of each character, and associate the first image and the second image of each character, wherein the second image of each character matches the first image of the each character;

obtain a third image of each character by performing a second image processing on the first image of each character, and obtain a fourth image of each character by performing the second image processing on the second image of each character;

obtain a fifth image of each character by performing a third image processing on the third image of each character;

obtain a sixth image of each character according to the fourth image and the fifth image of the each character; and determine a detection result of each character in the image to be detected according to the fifth image and the sixth image of the each character, comprising:

obtaining a number of first contours of each character by determining a number of character outlines in the fifth image of the each character; and obtaining a number of second contours of the each character by determining a number of character outlines in the sixth image of the each character;

comparing the number of first contours of each character with the number of the second contours of the each character;

determining that the character in the image to be detected is a defective character, when the number of first contours and the number of the second contours of the corresponding character are not equal; and determining that the character in the image to be detected is a standard character, when the number of first contours and the number of the second contours of the corresponding character are equal.

4. The computer device according to claim 3, wherein the number of first contours of each character comprises a number of first inner contours and a number of first outer contours of the each character, and the number of second contours of the each character comprises a number of second inner contours and a number of second outer contours of the each character;

wherein the at least one processor is further caused to: in response that the number of first inner contours of any one character is equal to the number of second inner contours of the any one character, and the number of first outer contours of the any one character is equal to the number of second inner contours of the any one character, determine that the number of first contours of the any one character is equal to the number of the second contours of the any one character.

5. A non-transitory storage medium having stored thereon at least one computer-readable instructions, which when executed by a processor of a computer device, causes the processor to perform a method of detecting printing defects, wherein the method comprises:

obtaining a reference image and an image to be detected;

obtaining a first image of each character in the reference image by performing a first image processing on the reference image, comprising: determining a first position of each character in the reference image; selecting each character in the reference image by applying a rectangular frame according to the first position of each character in the reference image, wherein there are a plurality of characters in the reference image, and each character in the reference image corresponding to one rectangular frame; and obtaining the first image of each character by cutting each character in the reference image along an edge of a corresponding rectangular frame;

obtaining a second image of each character from the image to be detected according to the first image of each character, and associating the first image and the second image of each character, wherein the second image of each character matches the first image of the each character;

obtaining a third image of each character by performing a second image processing on the first image of each character, and obtaining a fourth image of each character by performing the second image processing on the second image of each character;

obtaining a fifth image of each character by performing a third image processing on the third image of each character;

obtaining a sixth image of each character according to the fourth image and the fifth image of the each character; and determining a detection result of each character in the image to be detected according to the fifth image and the sixth image of the each character, comprising:

obtaining a number of first contours of each character by determining a number of character outlines in the fifth image of the each character; and obtaining a number of second contours of the each character by determining a number of character outlines in the sixth image of the each character;

comparing the number of first contours of each character with the number of the second contours of the each character;

determining that the character in the image to be detected is a defective character, when the number of first contours and the number of the second contours of the corresponding character are not equal; and determining that the character in the image to be detected is a standard character, when the number of first contours and the number of the second contours of the corresponding character are equal.

6. The non-transitory storage medium according to claim 5, wherein the number of first contours of each character comprises a number of first inner contours and a number of first outer contours of the each character, and the number of second contours of the each character comprises a number of second inner contours and a number of second outer contours of the each character;

wherein the method further comprises: in response that the number of first inner contours of any one character is equal to the number of second inner contours of the any one character, and the number of first outer contours of the any one character is equal to the number of second inner contours of the any one character, determining that the number of first contours of the any one character is equal to the number of the second contours of the any one character.

\* \* \* \* \*